United States Patent
McCallion

(12) 
(10) Patent No.: US 6,265,065 B1
(45) Date of Patent: Jul. 24, 2001

(54) CONCRETE REINFORCEMENT PROTECTION SYSTEM

(76) Inventor: James P. McCallion, 23352 Saint Elena, Mission Viejo, CA (US) 92691

( * ) Notice: Subject to any disclaimer, the term of this patent is extended or adjusted under 35 U.S.C. 154(b) by 0 days.

(21) Appl. No.: 08/145,974

(22) Filed: Oct. 29, 1993

(51) Int. Cl.$^7$ .................................................. D02G 3/00
(52) U.S. Cl. ...................... 428/375; 428/34.9; 428/36.9; 428/383; 174/35 R; 52/726.1; 52/740.1
(58) Field of Search .................. 428/34.9, 36.9, 428/375, 383; 174/35 R; 403/28, 273, 300, 305; 52/309.15, 309.16, 726.1, 738.1, 740.1

(56) References Cited

U.S. PATENT DOCUMENTS

| | | | |
|---|---|---|---|
| 3,297,819 | * 1/1967 | Wetmore | 174/127 |
| 3,540,763 | 11/1970 | Yee | 403/265 |
| 3,552,787 | 1/1971 | Yee | 403/265 |
| 3,582,457 | 6/1971 | Bartbell et al. | 161/166 |
| 4,016,356 | 4/1977 | McLoughlin | 174/35 R |
| 4,124,983 | 11/1978 | Weatherby | 405/260 |
| 4,143,986 | * 3/1979 | Antosh | 52/726.1 |
| 4,371,578 | 2/1983 | Thompson | 428/192 |
| 4,624,879 | * 11/1986 | Van Dijck et al. | 428/102 |
| 4,650,703 | 3/1987 | Kleinheins | 428/913 |
| 4,666,326 | 5/1987 | Hope | 403/265 |
| 4,692,052 | 9/1987 | Yee | 403/265 |
| 4,699,821 | * 10/1987 | Hallock | 428/192 |
| 4,728,550 | * 3/1988 | Van Beersel et al. | 428/34.9 |
| 4,832,382 | 5/1989 | Kapgan | 285/369 |
| 4,896,904 | 1/1990 | Gadsden | 285/381 |
| 4,950,343 | * 8/1990 | Shimirak et al. | 428/34.9 |
| 4,980,214 | * 12/1990 | Charriere | 428/34.9 |
| 4,993,149 | 2/1991 | Zilligen et al. | 29/859 |
| 5,087,492 | * 2/1992 | Vallauri et al. | 428/34.9 |
| 5,134,000 | * 7/1992 | Smythe et al. | 428/34.9 |
| 5,158,527 | * 10/1992 | Bernard | 52/726.1 |
| 5,175,032 | * 12/1992 | Steele et al. | 428/34.9 |
| 5,372,449 | * 12/1994 | Bauer et al. | 403/23 |

\* cited by examiner

Primary Examiner—William Krynski
Assistant Examiner—J. M. Gray

(57) ABSTRACT

A corrosion-resistant joint for use on concrete reinforcing rods and a method to create such a joint are provided. Metal reinforcing bars are typically coated to resist corrosion. However, cutting, welding and mechanical joining of these rods disturbs the anticorrosion coating and introduces sites of potential corrosion. The corrosion-resistant joint comprises a first rod joined to a second rod with a two-layered plastic sleeve slid over the joint. A corrosion-resistant joint is created by heating the joint, causing the inner layer of the sleeve to liquefy while the outer layer shrinks, forcing the liquid inner layer into the intricacies of the joint creating a corrosion barrier. Ends of rods and regions of a rod from which the anticorrosion coating has been accidentally removed can also be protected from corrosion.

5 Claims, 1 Drawing Sheet

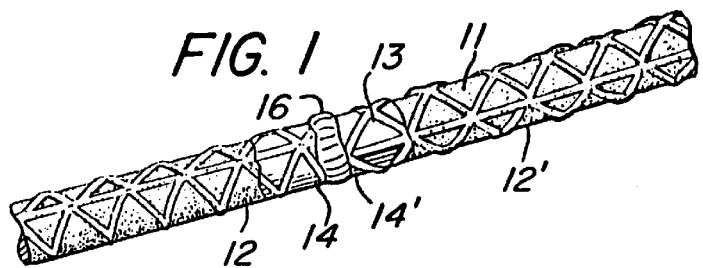
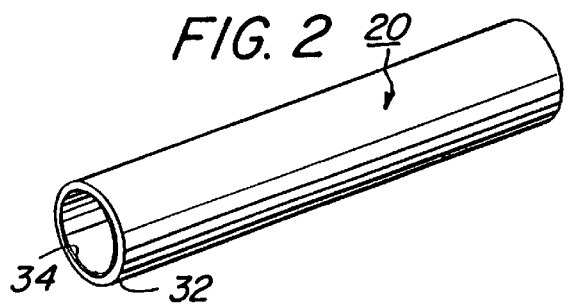
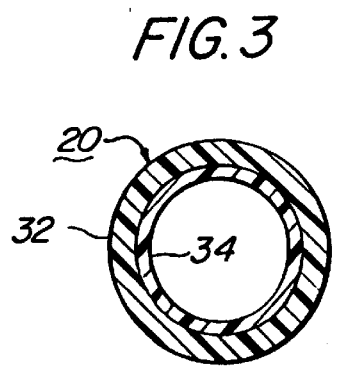
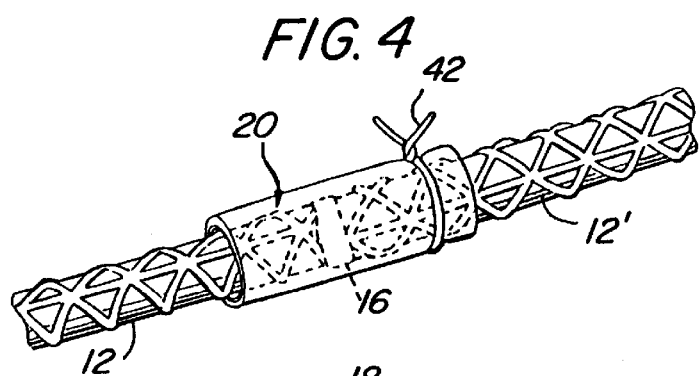
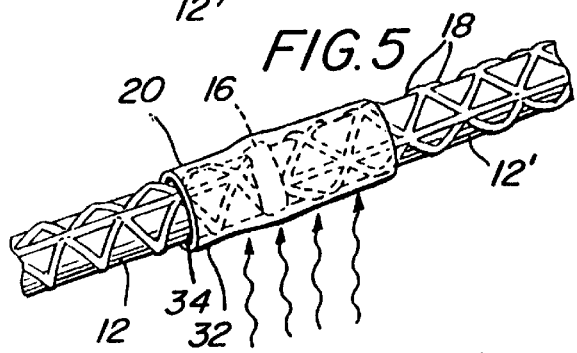
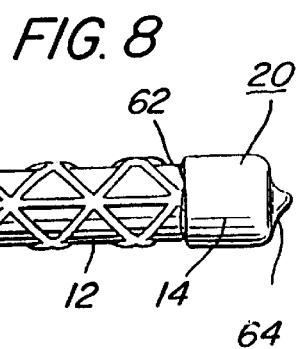
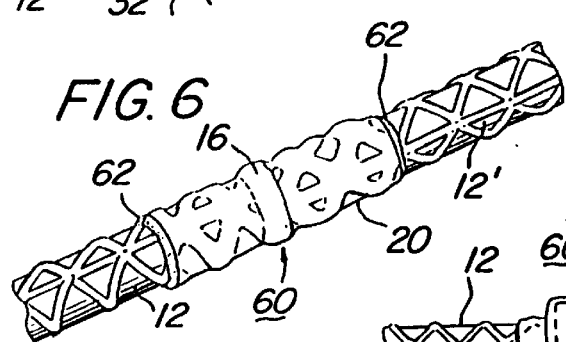
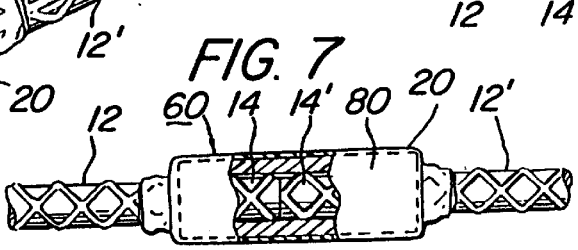

CONCRETE REINFORCEMENT PROTECTION SYSTEM

BACKGROUND OF THE INVENTION

1. Field of the Invention

The present invention is in the area of concrete reinforcements, that is, rods of metal or other materials, used to strengthen the concrete used in buildings and other construction. More specifically, the present invention encompasses a corrosion-resistant joint for metal reinforcements.

2. Description of Related Art

One of the most ubiquitous construction materials of our civilization is concrete. Everything from high rise buildings to bridges is constructed of concrete. Unhardened concrete is typically an aqueous mixture of Portland cement powder with sand and gravel. Portland cement is an extremely alkaline material produced from limestone and clay. After the liquid slurry is placed in forms, an exothermic chemical reaction occurs in which insoluble silicate crystals grow and interlock the sand and gravel grains. The forms are removed after the concrete hardens, or "cures." While the interlocking silicate structure is extremely hard, it has the drawback of being quite brittle. Therefore, if the hardened concrete is exposed to excess force, it will crumble. To overcome this problem, concrete is usually reinforced with metal or other materials to impart increased flexural strength characteristics.

The use of metal rods or "rebar" is a common and economical way to reinforce concrete. These rods, usually of steel, are available in a number of different sizes and lengths. The rods are typically cut and bent to fit the concrete structure, and the concrete is then placed around and over the rods. The reinforcing rods are completely embedded in the concrete matrix. As the mixture hardens, the concrete bonds strongly to the surface of the rods which, in turn, impart flexural strength to the concrete mass. Of course, rods do not come in the exact lengths for all concrete forms. Typically, the rods must be cut and spliced to fit a particular job. Because the final strength of the cured concrete depends on the strength of the reinforcing rods, splices must not weaken the rod. Rods are often spliced by some sort of welding process, although mechanical fasteners such as shown in U.S. Pat. No. 4,666,326 to Hope, and U.S. Pat. Nos. 3,540,763, 3,552,787, and 4,692,052 to Yee are also commonly used.

As already mentioned, the strength of the hardened concrete depends, to a great extent, on the strength of the reinforcing rods. Therefore, corrosion of the rods becomes a serious problem. Hardened concrete is somewhat porous so that air and moisture can penetrate and contact the reinforcing rods and promote oxidation (rust). Furthermore, the wet concrete itself is alkaline, which can further promote the corrosion of the metal. When rods rust, they not only lose their strength, but they also swell, causing the concrete to split. To overcome the corrosion problem, reinforcing rods are often coated with zinc (galvanized) or with plastic such as epoxy.

A difficulty with coated rods is that it is relatively easy to accidentally scrape away the coating on the rods during transport or installation. In addition, the coating must be removed prior to welding rods together.

Messy and toxic epoxy mixtures are available to coat welds and scrapes to avoid future corrosion. However, such materials are laborious to apply and often require significant time to harden properly after application. Furthermore, if the surface to be coated is not properly cleaned, or is wet, or if the ambient temperature is not correct, the coating fails to adhere properly and corrosion is not adequately inhibited.

OBJECTS AND SUMMARY OF THE INVENTION

It is an object of the present invention to provide a corrosion-resistant joint for concrete reinforcing rods.

It is also an object of the present invention to provide a method of ensuring that joints or other regions on reinforcing rods from which the anticorrosion coating has been removed are adequately protected from corrosion.

It is a further object of the present invention to provide a simple-to-use way for creating a corrosion- resistant joint without the application of any messy or toxic chemicals.

Applicant has created a corrosion-resistant joint comprising a weld or other connection between reinforcing rods that is covered by an open-ended sleeve of plastic polymer. The sleeve is constructed of two layers, an inner layer of thermoplastic polymer and an outer layer of heat- shrinkable polymer. When heat is applied to the joint, the thermoplastic layer liquefies and, at the same time, the heat-shrinkable layer begins to shrink. The shrinkage of the outer layer forces the liquefied inner layer into the intricacies of the joint. When the joint cools, the polymer hardens to form an impenetrable barrier to corrosion-causing elements such as oxygen and water. The inner layer of the sleeve remains attached to the outer layer, which serves as an additional corrosion barrier and protects the inner layer from accidental abrasion.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 1 is a perspective view of two anticorrosion coated reinforcing rods that have been joined end-to-end by a weld;

FIG. 2 is a perspective view of the open-ended sleeve that is an element of the corrosion-resistant joint;

FIG. 3 is a cross-section of the open-ended sleeve;

FIG. 4 is a perspective view of the joint shown in FIG. 3 with an open-ended sleeve slipped over the joint;

FIG. 5 is a view of the joint shown in FIG. 4 to which heat is being applied;

FIG. 6 is a perspective view of the completed corrosion-resistant joint of the present invention produced after the application of heat to the joint of FIG. 4;

FIG. 7 is a perspective view of the corrosion-resistant joint of the present invention in which the rods have been joined by a mechanical joining device; and FIG. 8 is a perspective view of the end of a rod protected from corrosion.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a corrosion-resistant joint for anticorrosion coated metal concrete reinforcing rods.

FIG. 1 shows a first reinforcing rod 12 and a second reinforcing rod 12'. The rods are covered with an anticorrosion coating 11 such as zinc or epoxy plastic. The anticorrosion coating 11 has been removed in the regions 13 adjacent to the ends 14, 14' of the rods 12, 12'. This is to allow a weld 16 to adhere to the rods 12, 12' and join them together end-to-end. Of course, the weld 16 and the regions 13 in which the coating has been removed are areas of potential corrosion.

FIG. 2 shows the open-ended sleeve 20 that is an element of a corrosion-resistant joint 60 of the present invention. The sleeve 20 is of an adequate diameter to slip over the rods 12, 12' and the weld 16. As shown in Table I, different diameters of sleeves 20 are required for various standard sizes of reinforcing rods 12. In 20 addition, different weld types or mechanical joining devices may require different sleeve diameters.

A cross-section of the sleeve 20 is shown in FIG. 3. The sleeve 20 comprises an outer layer 32 and an inner layer 34.

TABLE I

| Sleeve Internal Diameter | Rod Size for Repair or End Seal | Rod Size for Welded or Mechanical Joints or Coupling Transitions |
| --- | --- | --- |
| 1" | 3, 4, 6, or 7 | 3, 4, or 5 |
|  |  | 4/3 or 5/3 transition |
| 1.5" | 8, 9, 10, or 11 | 6 |
|  |  | 6/4, or 6/5 transition |
| 2" | 14 | 7, 8, or 9 |
|  |  | 7/5, 7/6, 8/5, 8/6, 8/7, 9/6, 9/7, or 9/8 transition |
| 3" | 18 | 10, 11, or 14 |
|  |  | 10/7, 10/8, 10/9, 11/7, 11/8, 11/9, 11/10, 14/8, 14/9, 14/10, or 14/11 transition |
| 4" | n/a | 18/10, 18/11, or 18/14 transition |

The outer layer 32 is composed of a heat-shrinkable polymer. That is to say, when heat is applied to the outer layer 32, the polymer molecules reorient so as to result in a significant reduction in the diameter of the sleeve. The preferred embodiment uses an outer layer 32 of cross-linked polyolefin, but other polymers with adequate heat shrinkage properties can be used.

The inner layer 34 is comprised of a thermo-plastic polymer that liquefies when heated. The material of the inner layer 34 is compatible with the outer layer 32 so that they always remain fused to one another. The present invention uses a polyamide polymer, or a vinyl acetate polymer, but other thermoplastic materials can be used as well.

FIG. 4 represents a partially constructed corrosion-resistant joint. As in FIG. 1, the reinforcing rods 12, 12' have been welded end-to-end, but now an appropriately-sized open-ended sleeve 20 has been slipped over the weld 16 and regions 13 of the rods 12, 12' from which the anticorrosion coating has been removed. In actual practice the sleeve 20 would be slipped over one of the rods 12 before the second rod 12' was brought into position and the weld 16 made. Then the sleeve 20 would then be slid into position and temporarily held in place with a piece of wire 42 or tape.

FIG. 5 shows the structure of FIG. 4 in the process of being heated. Heat can be advantageously applied with an electric heat gun such as one manufactured by the Milwaukee Electric Co., or with a gas torch such as a Bernz-O-Matic torch. The materials of the preferred embodiment are designed to respond optimally to a temperature of about 110° C. At that temperature the outer layer 22 of the sleeve 20 begins to shrink, as shown. At the same time the inner layer 24 liquefies and begins to flow into the intricacies 18 of the rod surface and over and around the weld 16. The shrinking of the outer layer 22 forces the liquid inner layer 24 to penetrate and coat the region covered by the sleeve 20.

FIG. 6 shows a completed corrosion-resistant joint 60. The outer layer 22 has finished shrinking and has conformed both to the rods 12, 12' and to the weld 16. The inner layer 24 has been forced to completely coat the structures covered by the sleeve 20 and has been forced out of the ends 64 of the sleeve to form a bead 62. Upon cooling, the polymer hardens and the combined structure of the outer and inner layer form a barrier to corrosion-causing elements such as water and oxygen. The bead 62 provides a seal between the ends 64 of the sleeve 20 and the rods 12, 12' and acts as a visual indicator that heat has been properly applied and the corrosion barrier has formed.

Methods other than end-to-end welds can be used to join reinforcing rods. FIG. 7 shows a corrosion-resistant joint 60 where the rods 12, 12' have been connected by a mechanical joining device 80. The figure shows one of many types of mechanical joining devices that are available to the construction art. The present invention is compatible with a wide variety of mechanical joining devices. Of course, it is necessary to select a sleeve 20 of a large enough diameter to accommodate the connection between the rods 12, 12'. Often one rod size must be connected to a different rod size. Mechanical joining devices are particularly favored in such an application. The sleeves 20 are capable of sufficient heat-induced shrinkage to successfully create a corrosion-resistant joint even where one size of rod is transitioned to another size.

Other sites of rod corrosion are rod ends and damaged areas along the length of the rods. When a rod is cut, unprotected metal is exposed. FIG. 8 shows a sleeve 20 used to create a corrosion barrier at the end 14 of a rod 12. The sleeve 20 is temporarily fixed to the end of the rod 12. After the sleeve 20 is heated and before it cools, the open end 64 is pinched with a pliers, or similar tool, to seal it shut. Often areas of a rod 12 become damaged and lose their anticorrosion coating. Because the rods 12, 12' have already been joined together, it is not possible to slip a sleeve 20 over the end 14 of the rod 12. Such damage may be repaired by slitting a sleeve 20 length-wise so that it can be slipped into place over the damaged area even though there is no free end 14 of the rod 12 over which to slip an intact sleeve. Application of heat completes the repair of the anticorrosion coating.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A corrosion-resistant structural member comprising:
   a first length of reinforcing rod having an anticorrosion coating and having a connecting end with a corrodible surface formed by removal of the anti-corrosion coating at the connecting end;

a second length of reinforcing rod having an anticorrosion coating and having a connecting end with a corrodible surface formed by removal of the anti- corrosion coating at the connecting end;

a joint physically connecting the rods to one another at their respective connecting ends;

an open-ended sleeve sized to slide onto the connected rods and to cover the joint and the corrodible surfaces of the rods;

an inner layer of the sleeve comprising a thermoplastic polymer for softening and liquefying when heat is applied to the structural member; and an outer layer of the sleeve comprising a heat-shrinkable polymer for shrinking when heat is applied to the structural member, and for forcing the liquefied inner layer into intimate contact with the corrodible surfaces, the liquefied thermoplastic polymer coating the corrodible surfaces and the joint, and exuding from open ends of the sleeve, forming a bead and acting as a barrier to corrosion-causing elements.

2. The structural member of claim 1 where the second polymer comprises a polyolefin polymer and the first polymer is selected from the group consisting of a polyamide polymer and a vinyl acetate polymer.

3. The structural member of claim 1 where the joint comprises a weld between abutting connecting ends of the rods.

4. The structural member of claim 1 where the joint comprises a mechanical joining device linking the connecting ends of the rods.

5. A corrosion-resistant structural member comprising:

a first length of reinforcing rod having an anticorrosion coating and having a connecting end with a corrodible surface formed by removal of the anticorrosion coating at the connecting end;

a second length of reinforcing rod having an anticorrosion coating and having a connecting end with a corrodible surface formed by removal of the anticorrosion coating at the connecting end;

a weld physically connecting the rods to one another at their respective connecting ends;

an open-ended sleeve sized to slide onto the connected rods and to cover the weld and the corrodible surfaces of the rods;

an inner layer of the sleeve comprising a thermoplastic polymer, selected from the group consisting of a polyamide polymer and a vinyl acetate polymer, for softening and liquefying when heated to about 110° C.; and an outer layer of the sleeve comprising a heat-shrinkable polyolefin for shrinking when heated to about 110° C. and for forcing the liquefied inner layer into contact with the corrodible surfaces, coating the corrodible surfaces and the weld, and exuding from open ends of the sleeve to form a bead and to act as a barrier to corrosion-causing elements.

\* \* \* \* \*